(12) United States Patent
McElveen et al.

(10) Patent No.: US 12,170,459 B2
(45) Date of Patent: Dec. 17, 2024

(54) TAPPED WINDING METHOD FOR EXTENDED CONSTANT HORSEPOWER SPEED RANGE

(71) Applicant: ABB Schweiz AG, Baden (CH)

(72) Inventors: Robert F. McElveen, Anderson, SC (US); William E. Martin, Greenville, SC (US)

(73) Assignee: ABB SCHWEIZ AG, Baden (CH)

( * ) Notice: Subject to any disclaimer, the term of this patent is extended or adjusted under 35 U.S.C. 154(b) by 593 days.

(21) Appl. No.: 17/461,429

(22) Filed: Aug. 30, 2021

(65) Prior Publication Data

US 2023/0060549 A1 Mar. 2, 2023

(51) Int. Cl.
*H02K 1/16* (2006.01)
*H02K 3/12* (2006.01)
*H02K 3/48* (2006.01)
*H02K 15/04* (2006.01)

(52) U.S. Cl.
CPC ............... *H02K 1/16* (2013.01); *H02K 3/12* (2013.01); *H02K 3/48* (2013.01); *H02K 15/0435* (2013.01)

(58) Field of Classification Search
CPC .. H02K 1/16; H02K 3/12; H02K 3/48; H02K 15/0435
USPC ........................................................ 310/208
See application file for complete search history.

(56) References Cited

U.S. PATENT DOCUMENTS

| | | | |
|---|---|---|---|
| 10,916,983 B2 * | 2/2021 | Aida | H02K 1/2766 |
| 10,951,151 B2 * | 3/2021 | Chinen | H02K 3/28 |
| 11,201,529 B2 * | 12/2021 | Asano | H02K 19/12 |
| 11,515,771 B2 * | 11/2022 | Bilgin | H02P 25/092 |
| 11,923,727 B2 * | 3/2024 | Nashiki | H02K 37/04 |
| 11,923,733 B2 * | 3/2024 | Mao | H02K 1/146 |
| 2008/0116759 A1 * | 5/2008 | Lin | H02P 25/188 310/156.01 |
| 2012/0187758 A1 * | 7/2012 | Boskovitch | B60K 6/46 180/65.245 |
| 2016/0020717 A1 * | 1/2016 | Tang | H02P 21/05 318/798 |
| 2017/0110942 A1 * | 4/2017 | Blatterman | H02P 25/083 |
| 2017/0149351 A1 * | 5/2017 | Hollenbeck | H02M 3/1584 |
| 2019/0252994 A1 * | 8/2019 | Kobayashi | B60L 50/50 |
| 2020/0052638 A1 * | 2/2020 | Kinjo | H02K 17/42 |
| 2020/0099327 A1 * | 3/2020 | Nashiki | H02K 3/28 |
| 2020/0127589 A1 * | 4/2020 | Nashiki | H02P 23/009 |

(Continued)

FOREIGN PATENT DOCUMENTS

CN 107026527 A 8/2017

*Primary Examiner* — Rashad H Johnson
(74) *Attorney, Agent, or Firm* — Greenberg Traurig, LLP (57) ABSTRACT

The disclosed embodiments describe a tapped winding stator for use in an electric motor. In some embodiments, the electric motor includes a stator body. In some embodiments, a plurality of teeth that are adjacent in a circumferential direction. In some embodiments, a plurality of slots are formed between the plurality of teeth. In some embodiments, a plurality of coils are mounted in each of the plurality of slots. In some embodiments, the plurality of coils are tapped in a configuration that allows the stator to selectively bypass one or more of the plurality of coils in operation. A plurality of switches are electrically coupled between the configuration and a respective phase supply to the electric motor, each of the switches having at least a first position and a second position.

20 Claims, 6 Drawing Sheets

(56) References Cited

U.S. PATENT DOCUMENTS

| | | | |
|---|---|---|---|
| 2021/0028729 A1* | 1/2021 | Cox | H02P 4/00 |
| 2021/0135513 A1* | 5/2021 | Takizawa | H02P 25/22 |
| 2021/0167645 A1* | 6/2021 | Nashiki | H02K 19/103 |
| 2021/0226499 A1* | 7/2021 | Seguchi | H02K 1/22 |
| 2021/0257950 A1* | 8/2021 | Taniguchi | H02P 27/085 |
| 2021/0313912 A1* | 10/2021 | Taniguchi | H02P 27/08 |
| 2022/0014124 A1* | 1/2022 | Ono | H02P 25/022 |
| 2022/0045586 A1 | 2/2022 | McElveen et al. | |
| 2022/0115919 A1* | 4/2022 | Nashiki | H02K 1/146 |
| 2022/0194210 A1* | 6/2022 | Takahashi | B60K 1/02 |
| 2022/0209697 A1* | 6/2022 | Miyama | H02P 27/12 |
| 2022/0255386 A1* | 8/2022 | Hijikata | H02K 3/12 |
| 2022/0294284 A1* | 9/2022 | Deng | H02K 1/165 |
| 2022/0416707 A1* | 12/2022 | Chen | H02P 25/08 |
| 2023/0231456 A1* | 7/2023 | Masuko | H02K 3/12 |
| | | | 417/410.1 |
| 2023/0231457 A1* | 7/2023 | Kouda | H02K 9/06 |
| | | | 310/50 |
| 2023/0283154 A1* | 9/2023 | Zhu | H02P 25/107 |
| | | | 318/496 |
| 2024/0006967 A1* | 1/2024 | Seguchi | H02K 11/0094 |

* cited by examiner

TAPPED WINDING METHOD FOR EXTENDED CONSTANT HORSEPOWER SPEED RANGE

FIELD

This disclosure relates generally to a stator for an electric motor. More particularly, this disclosure relates to a tapped winding for a stator of an electric motor.

BACKGROUND

Electric motors typically include a rotating rotor and a stationary stator. Stators typically include a plurality of windings, and each winding may correspond to a bundle of conductive coils. For instance, conventional brushless permanent magnet servomotor configurations that are common in the marketplace include 4-pole rotor-12 slot stator motors; 4 pole-24 slot motors; 6 pole-18 slot motors; and 6 pole-36 slot motors. For concentric type of stator winding, the windings are wound in very high density either directly on the tooth or on separate bobbins and subsequently transferred onto the tooth of the stator core. Bobbin winding requires some sacrifice of available winding area to get good layering, but very high density windings can be achieved. With the coils in place, a stator assembly process goes through stator connection to link all the coils in each of the phases.

SUMMARY

In some embodiments, a tapped winding stator for use in an electric motor includes a stator body. In some embodiments, the tapped winding stator includes a plurality of teeth that are adjacent in a circumferential direction. In some embodiments, the tapped winding stator includes a plurality of slots that are formed between the plurality of teeth. In some embodiments, the tapped winding stator includes a plurality of coils mounted in each of the plurality of slots, wherein the plurality of coils are tapped in a configuration that allows the stator to selectively bypass one or more of the plurality of coils in operation. In some embodiments, the tapped winding stator includes a plurality of switches electrically coupled between the configuration and a respective phase supply to the electric motor, each of the switches having at least a first position and a second position.

In some embodiments, each of the plurality of coils comprises a continuous electric conductor have a first end and a second end, the first end forming a stator lead connected to another coil of the stator. In some embodiments, wherein one or more of the plurality of coils are tapped with an additional stator lead.

In some embodiments, the bypassing allows the electric motor to operate at an increased amount of torque.

In some embodiments, the bypassing allows the electric motor to operate at a reduced amount of back electromotive force (EMF).

In some embodiments, the electric motor is an inverter-fed motor.

In some embodiments, the electric motor is an induction motor.

In some embodiments, the electric motor is a permanent magnet motor.

In some embodiments, a method for increasing a constant horsepower speed range of an electric motor includes coupling an electric motor having a tapped winding stator to a phase supply. In some embodiments, the tapped winding stator includes a stator body. In some embodiments, a plurality of teeth are adjacent in a circumferential direction. In some embodiments, a plurality of slots are formed between the plurality of teeth. In some embodiments, a plurality of coils are mounted in each of the plurality of slots. In some embodiments, the plurality of coils are tapped in a configuration that allows the stator to selectively bypass one or more of the plurality of coils in operation. In some embodiments, a plurality of switches electrically coupled between the configuration and the phase supply. In some embodiments, each of the switches have at least a first position and a second position. In some embodiments, the method includes operating the plurality of switches to form electric contacts via the configuration to bypass one or more coils of the plurality of coils from connecting to the phase supply.

In some embodiments, each of the plurality of coils includes a continuous electric conductor having a first end and a second end, the first end forming a stator lead connected to another coil of the stator. In some embodiments, one or more of the plurality of coils are tapped with an additional stator lead.

In some embodiments, the bypassing allows the electric motor to operate at an increased amount of torque.

In some embodiments, the bypassing allows the electric motor to operate at a reduced amount of back electromotive force (EMF).

In some embodiments, the electric motor is an inverter-fed motor.

In some embodiments, the electric motor is an induction motor.

In some embodiments, the electric motor is a permanent magnet motor.

In some embodiments, a method for winding a stator for use in an electric motor includes obtaining a conductor. In some embodiments, the method includes winding the conductor along a circumferential direction around a rotation axis corresponding to an axis of symmetry of a stator to form a first stator lead of the conductor. In some embodiments, the method includes disposing a second stator lead on the conductor to form an electric contact between the first stator lead and the second stator lead to form a tap.

In some embodiments, the second stator lead is configured to bypass one or more conductors of the winding and reduce a number of effective conductors per phase.

In some embodiments, the second stator lead is configured to bypass one or more conductors of the winding and increase a flux level of the electric motor.

In some embodiments, the electric motor is an inverter-fed motor.

In some embodiments, the electric motor is an induction motor.

In some embodiments, the electric motor is a permanent magnet motor.

BRIEF DESCRIPTION OF THE DRAWINGS

References are made to the accompanying drawings that form a part of this disclosure and that illustrate embodiments in which the systems and methods described in this Specification can be practiced.

Like reference numbers represent the same or similar parts throughout.

DETAILED DESCRIPTION

Various applications (e.g., traction drives, winder drives, etc.) may demand a wide, constant horsepower speed range. Typically, this can be achieved with a shift base speed configuration, which can increase the full load amps and increase the drive size/cost. In operation, the constant horsepower speed range of an electric motor may be limited by the amount of breakdown (or pullout) torque that the electric motor has at base speed (or shifted base speed). As the applied frequency increases at a constant voltage level, the electric motor may eventually run out of torque, and the horsepower has to be decreased for further increases in speed. For permanent magnet motors, the generated back electromotive force (EMF) increases with speed, which can be a limiting factor on the highest operating speed allowed (based on the ability of the drive to handle a large back EMF).

Embodiments of the present disclosure provide a tapped winding stator for use in an electric motor. In some embodiments, the tapped winding stator can extend a constant horsepower speed range of the electric motor during operation.

Figure 1:
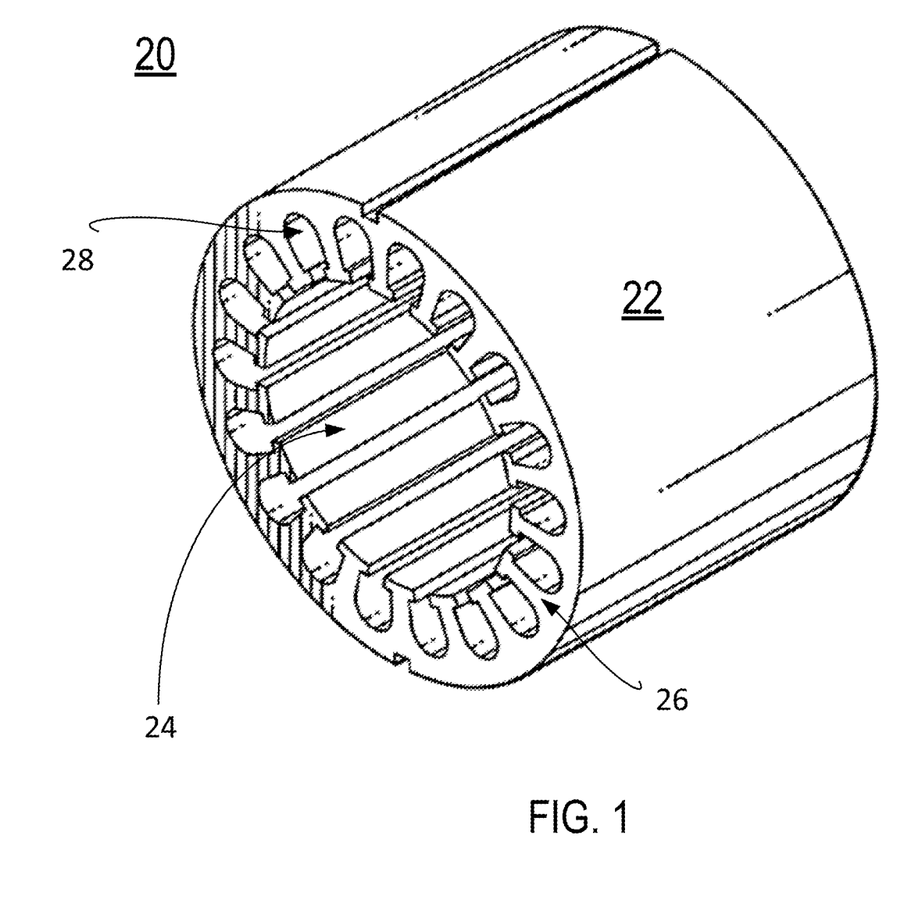
FIG. 1 shows a stator of a multi-phase motor, according to some embodiments.

FIG. 1 shows a stator 20 of an electric motor such as, but not limited to, a multi-phase electric motor, according to some embodiments.

As illustrated, the stator 20 includes a body 22 formed by laminating a plurality of silicon steel plates of the same shape in an axial direction. A hole 24 for inserting a rotor (not shown) therethrough is formed within the stator 20. A plurality of teeth 26 are formed along an inner surface of the stator 20. Every two adjacent teeth 26 may be equidistantly spaced apart from each other, thereby forming a slot 28 between every two adjacent teeth 26.

The winding (not shown) is wound around each tooth 26. As a result, the structure of the stator 20 may cause a rotational magnetic flux to be generated when electric power (e.g., AC electric power) is supplied to the winding. In some embodiments, the winding may include a plurality of coils. Each coil can include a continuous conductor having a first end and a second end. The first end may form a stator lead for connecting to the next coil for use in the same phase. The winding may be performed according to various techniques such as the configuration shown and described in accordance with FIGS. 2A-2C below.

The rotor can be rotatably mounted to a central portion of the stator 20 with a gap formed between the rotor and the stator 20. A shaft runs through and is fixed to an inserting hole (not shown) formed to a central portion of the rotor.

Although not illustrated herein, the stator 20 may be assembled with a suitable rotor and winding to form, for example, an inverter-fed motor, an induction motor, a permanent magnet motor, and the like.

For instance, the stator 20 may be assembled for use in a three phase AC motor. In such embodiments, the stator 20 may have a combination of a number of slots and a number of poles configured to correspond to a three phase machine. The stator winding may include a plurality of coils consisting of three complete sets of coils (three arrangements of coils) of the same configuration wherein each arrangement of coils corresponds to a phase of a three phase winding. Each of these arrangements of coils may further comprise its plurality of coils connected, for example, in series, to each other.

Figure 2A:
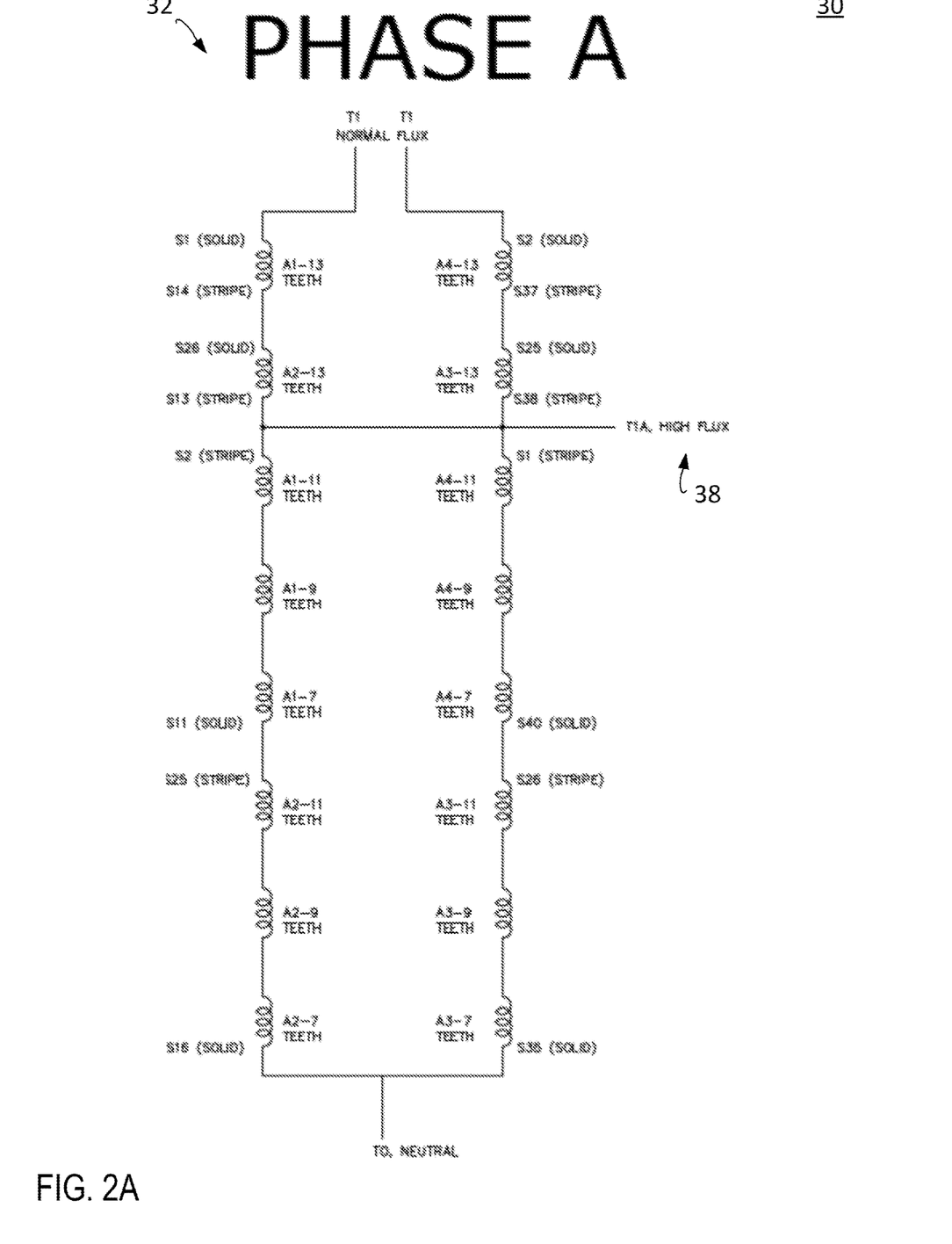
FIGS. 2A-2C show schematic circuit diagrams illustrating an example tapped stator winding, according to some embodiments.
Figure 2B:
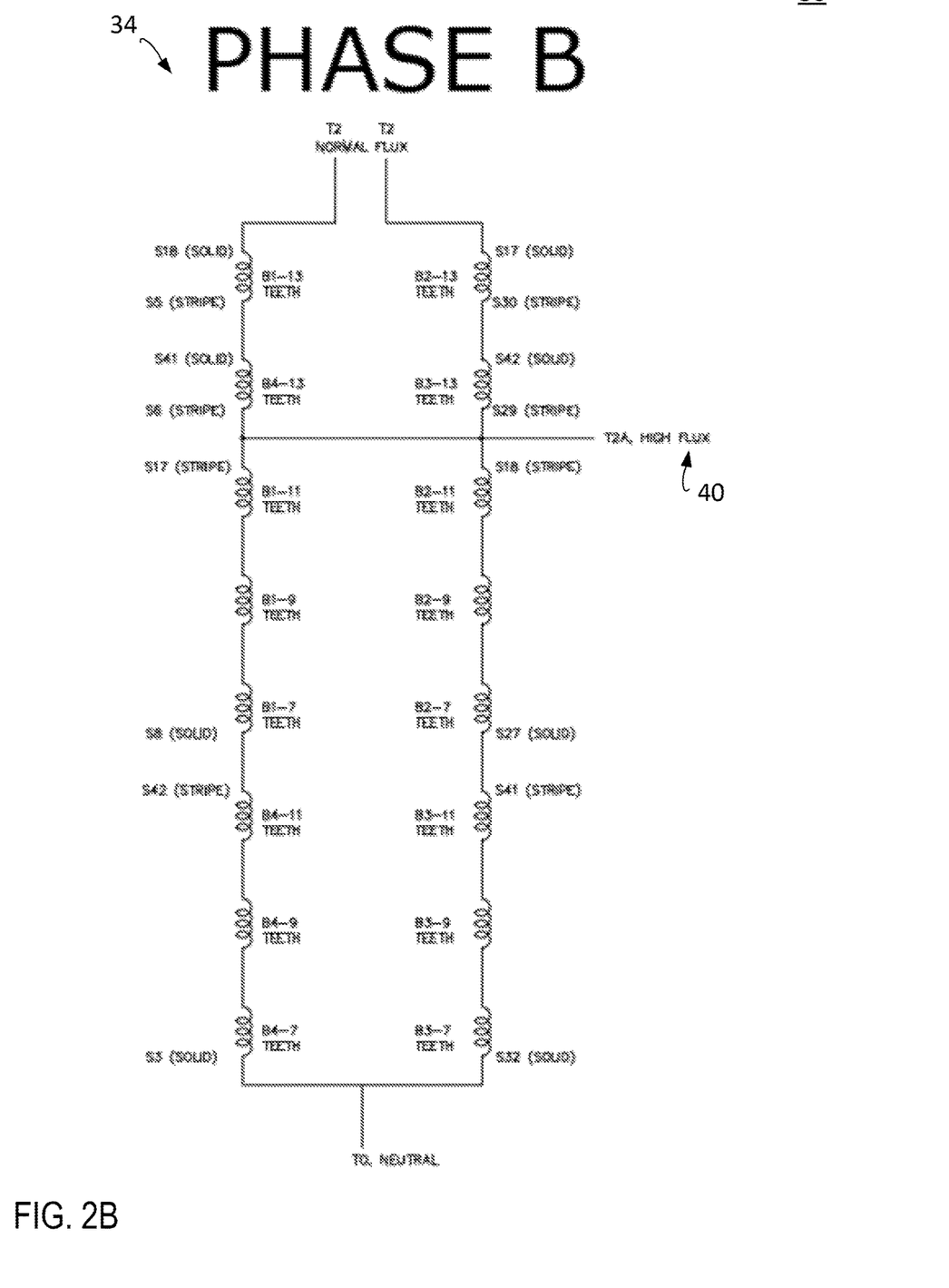
Figure 2C:
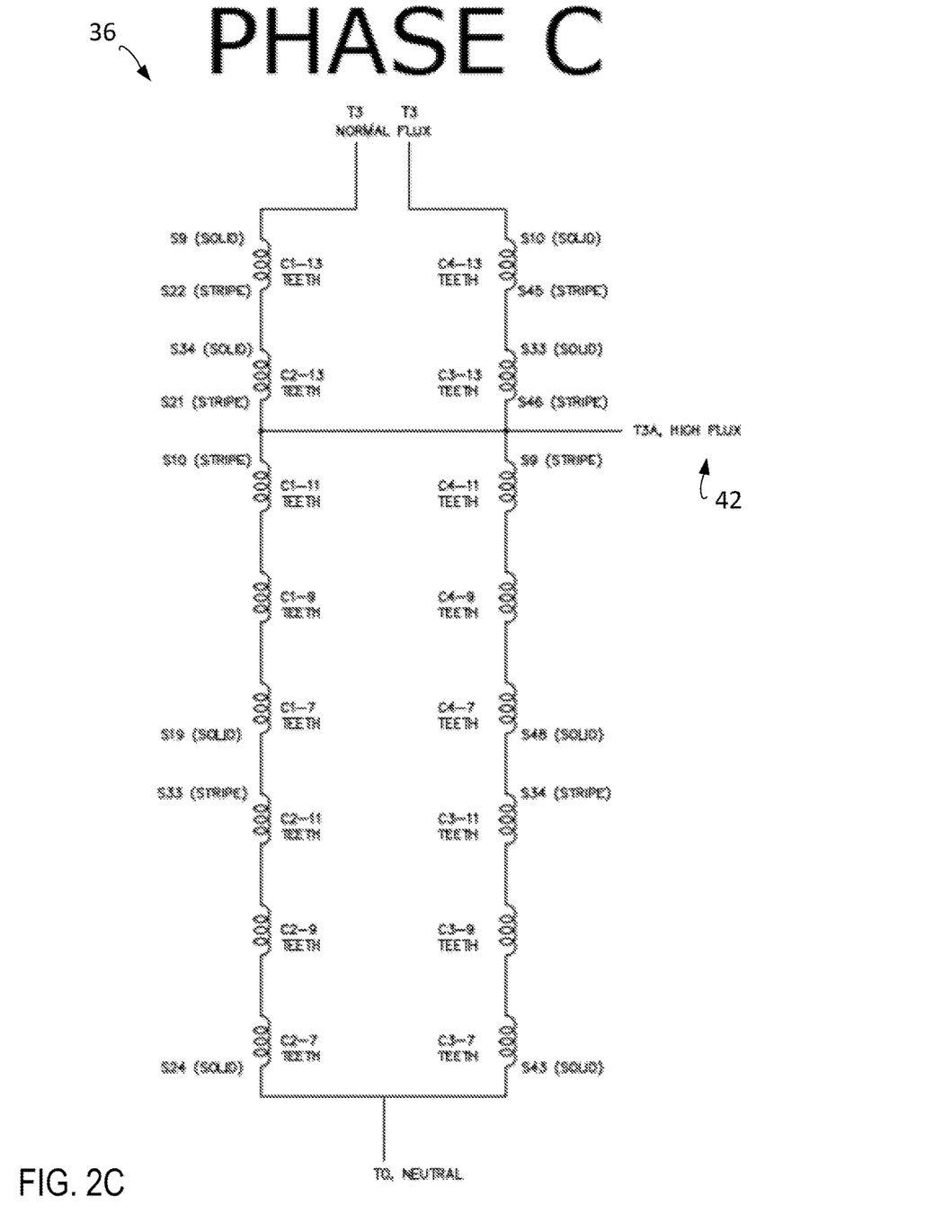

FIGS. 2A-2C show schematic circuit diagrams illustrating an example tapped stator winding 30, according to some embodiments. It is to be appreciated that FIGS. 2A-2C show an example. In some embodiments, the tapped stator winding 30 can include additional taps. In some embodiments, the tapped stator winding 30 can be tapped in a different location.

In the illustrated embodiment, the winding 30 is illustrated as three phase wiring of a stator (not shown) configured with 48 slots of slots (S1 through S48) and 4 poles corresponding to the three phases (A1 through A4, B1 through B4, and C1 through C4).

The winding 30 includes phase A (FIG. 2A) winding 32, phase B (FIG. 2B) winding 34, and phase C (FIG. 2C) winding 36. As described above with reference to FIG. 1, for a configuration of 48 slots, the stator (e.g., stator 20 of FIG. 1) is configured with a plurality of teeth (e.g., teeth 26 of FIG. 1) that form respective slots (e.g., slot 28 of FIG. 1) therein. For example, the plurality of teeth may include, corresponding to each of the four poles, tooth 1 through tooth 13 to define 12 slots per pole. In the example winding 30, there are 9 turns per coil (TPC) for the coils that span 13 teeth; 8 TPC for the coils that span 11 teeth and the coils that span 9 teeth; and 7 TPC for the coils that span 7 teeth.

As shown, in some embodiments, in addition to the stator lead connecting to the respective phase supply to the stator 20, an additional set of stator leads 38, 40, and 42 are connected to the phase A winding 32, phase B winding 34, and phase C winding 36, respectively. With the illustrated three phase winding, phase A winding 32 is tapped between the coils spanning slots S13 and S2, and the coils spanning slots S38 and S1. Similarly, phase B winding 34 is tapped between the coils spanning slots S8 and S17, as well as the coils spanning slots S29 and S18. Phase C winding 36 is tapped between the coils spanning slots S21 and S10, as well as the coils spanning slots S46 and S9.

In some embodiments, when the phase supply (not shown) is configured into electrical contact with the respective taps 38, 40, and 42 in each phase winding instead of the respective conventional stator leads in each phase winding (e.g., via a switch operation to disconnect from the conventional stator leads to connect to the taps), respective coils in each phase winding are bypassed.

In the illustrated embodiment, for phase A winding 32, the coils spanning slots S1 and S14, the coils spanning slots S26 and S13, the coils spanning slots S2 and S37, the coils spanning slots S25 and S38 can be bypassed. For phase B winding 34, the coils spanning slots S18 and S5, the coils spanning slots S41 and S6, the coils spanning slots S17 and S30, the coils spanning slots S42 and S29 can be bypassed. For phase C winding 36, the coils spanning slots S9 and S22, the coils spanning slots S34 and S21, the coils spanning slots S10 and S45, the coils spanning slots S33 and S46 can be bypassed.

In some embodiments, with coils bypassed as described above, a lesser number of coils are used in the stator winding. As a result, a higher level of flux is generated in the electric motor when the winding 30 is energized in operation. In some embodiments, a higher level of flux may increase an amount of torque for an induction motor or a permanent magnet motor. In some embodiments, the lower effective series conductors per phase increases the flux and reduces the back EMF. As a result, a constant horsepower range of the electric motor can be extended.

In this illustrated embodiment of FIGS. 2A-2C, the example tapped winding is shown for a stator of an electric motor having three phases (e.g., phase A, phase B, and phase C), 4 poles (e.g., A1 through A4, B1 through B4, and C1 through C4), and 48 slots (e.g., slots S1 through S48). Embodiments of tapped windings of various configurations can be applied to windings for various stators for use in any suitable motor having any suitable phase(s), any number of poles, as well as any number of slots.

In various embodiments, instead of configuring another full set of stator leads as taps on the winding as illustrated in FIGS. 2A-2C, any configuration of any number less than or more than the number included in the full set of additional stator leads may be disposed at any suitable position relative to the winding to provide the desired selection of coils in operations. In some embodiments, when a minimal number of coils are required in operation, no taps may be needed to bypass the minimally required group of coils. In some embodiments, when a minimal interval number of coils are required to modify the number of coils in operation, taps may be disposed on the coils in a manner that corresponds to the required interval number of coils. For instance, the taps may be disposed every other coil, every other two coils, and the like, depending on the desired operation.

In some embodiments, a tap (e.g., additional stator leads) may be coupled to a phase supply component of the electric motor via a switch (not illustrated). The phase supply component may be involved in energizing the winding of the stator according to various suitable phase requirements. In some embodiments, the switch may be configured with at least a first position and a second position. In some embodiments, the first position may configure the tap to be in electric contact with the phase supply component (e.g., an on position). In some embodiments, the second position may configure the tap to not be in electric contact with the phase supply component (e.g., an off position).

In some embodiments, one or more secondary switches may be coupled to the respective switches as above-described (e.g., direct tap connecting switches). For example, in a two-tiered configuration, with the direct-tap-connecting switches in place, a set of secondary switches may be configured to selectively connected to the direct-tap-connecting switches. As such, the secondary switches may further select a number of coils to bypass in operation depending on a dynamic selection of connections to the direct-tap-connecting switches.

The additional stator leads can be formed in any suitable shape and materials. For example, each of the plurality of coils of the winding may comprise a continuous electric conductor having a first end and a second end. The first end may form a stator lead. Without an additional stator lead, the first end may be configured to be connected to, via the stator lead, the next coil configured for use in the same phase. With the additional stator lead, the additional stator lead may be connected to a phase supply component of the stator. As a result, one or more of the plurality of coils may be tapped with such an additional stator lead.

Although not depicted in FIGS. 2A-2C, tapped windings according to various embodiments of the disclosure may be provided to stators for use with various electric motors such as, for example, an inverter-fed motor, an induction motor, and a permanent magnet motor. Further, such tapped windings may also be applicable to electric motors of various phase requirements, such as a single phase, two phase, three phase, or any desired multi-phase requirements.

In some embodiments, an electric motor having a tapped stator winding can have an increase in maximum speed of about 75% compared to an electric motor without a tapped stator winding with about 10% more losses and about 5.9% higher open circuit voltage. In some embodiments, an electric motor having a tapped stator winding can have an increase in maximum speed of about 65% with about 8% more losses and about the same open circuit voltage. In some embodiments, an electric motor having a tapped stator winding can have an increase in maximum speed of about 29% with about the same losses and about 22% lower open circuit voltage.

Figure 3:
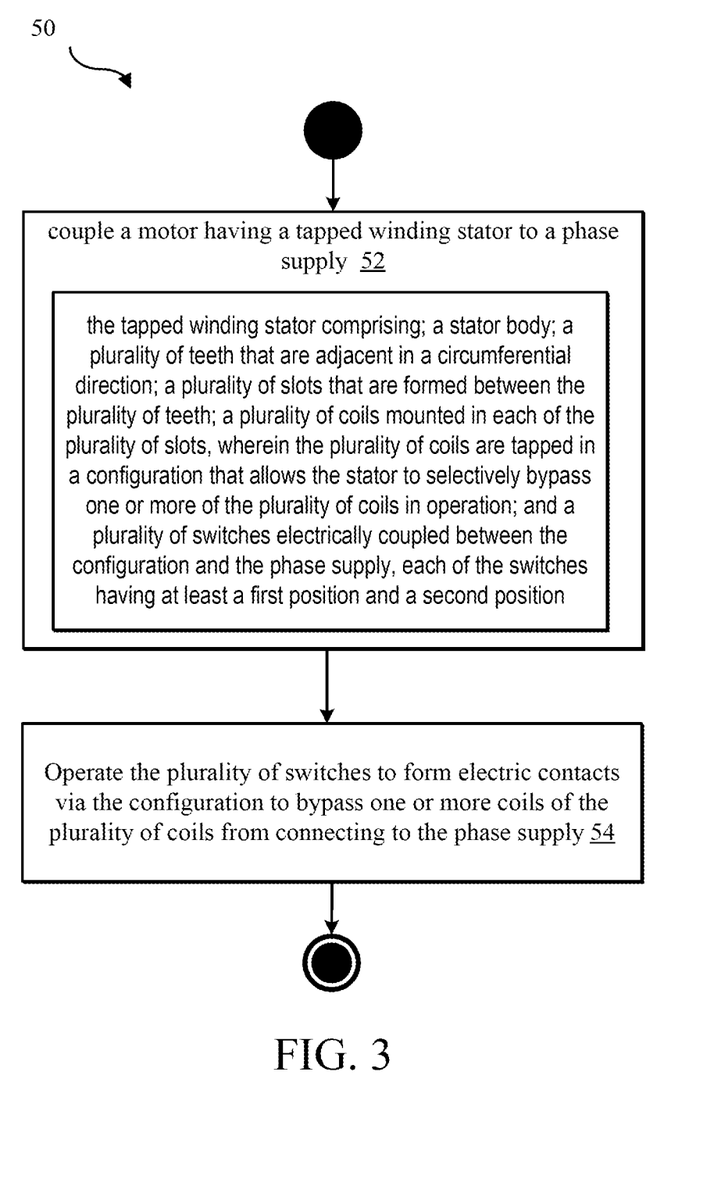
FIG. 3 is a flowchart of a method for increasing a constant horsepower speed range of an electric motor of a tapped winding stator, according to some embodiments.

FIG. 3 is a flowchart of a method 50 for increasing a constant horsepower speed range of an electric motor of a tapped winding stator, according to some embodiments.

In some embodiments, the method 50 can start at block 52. At block 52, an electric motor having a tapped winding stator may be coupled to a phase supply. In some embodiments, the tapped winding stator may include a stator body; a plurality of teeth that are adjacent in a circumferential direction; a plurality of slots that are formed between the plurality of teeth; and a plurality of coils mounted in each of the plurality of slots. The plurality of coils are tapped in a configuration that allows the stator to selectively bypass one or more of the plurality of coils in operation. A plurality of switches are electrically coupled between the configuration and the phase supply, each of the switches have at least a first position and a second position.

At block 54, the plurality of switches may be operated to form electric contacts via the configuration to bypass one or more coils of the plurality of coils from connecting to the phase supply.

In some embodiments, the bypassing may allow the electric motor to operate at an increased amount of torque.

In some embodiments, the bypassing may allow the electric motor to operate at a reduced amount of back electromotive force (EMF).

In some embodiments, the electric motor may be an inverter-fed motor.

In some embodiments, the electric motor may be an induction motor.

In some embodiments, the electric motor may be a permanent magnet motor.

Figure 4:
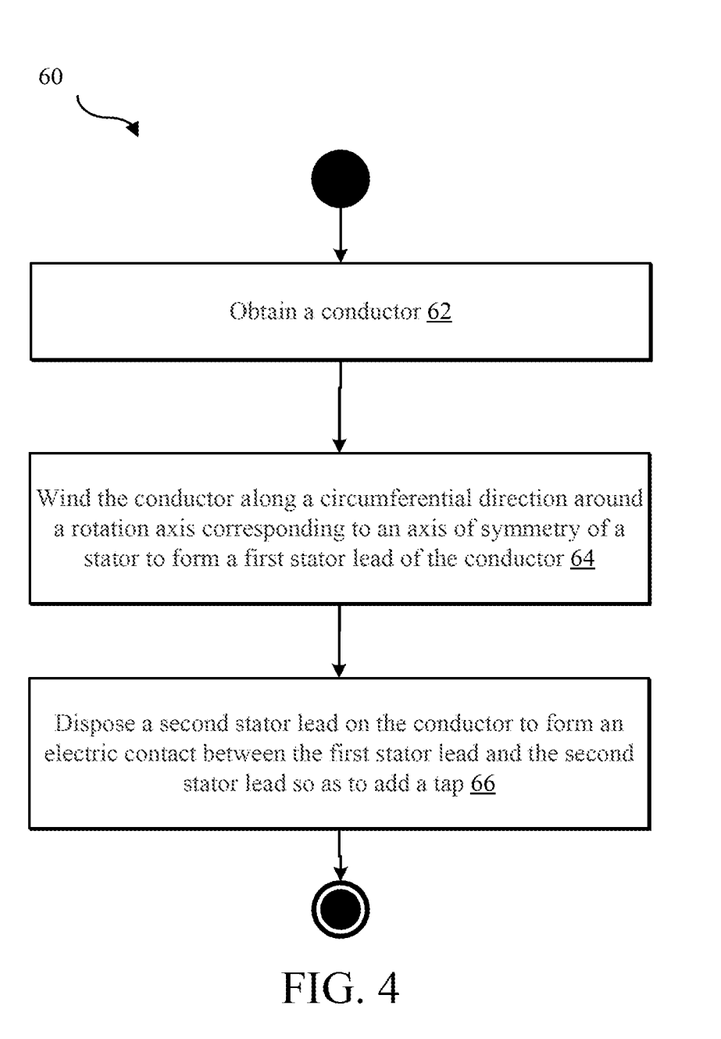
FIG. 4 is a flowchart of a method for winding a stator for use in an electric motor, according to some embodiments.

FIG. 4 is a flowchart of a method 60 for winding a stator for use in an electric motor, according to some embodiments.

In some embodiments, the method 60 can start at block 62. At block 62, a conductor is obtained. At block 64, the conductor is wound along a circumferential direction around a rotation axis corresponding to an axis of symmetry of a stator to form a first stator lead of the conductor. At block 66, a second stator lead is disposed on the conductor to form an electric contact between the first stator lead and the second stator lead to form a tap.

In some embodiments, the plurality of stator leads may be configured to bypass one or more coils of the winding and thereby reduce a number of effective conductors per phase.

In some embodiments, the plurality of stator leads may be configured to bypass one or more coils of the winding and thereby increasing a flux level of the electric motor.

In some embodiments, the electric motor may be an induction motor.

In some embodiments, the electric motor may be a permanent magnet motor

ASPECTS

It is to be appreciated that any one of aspects 1-20 can be combined with any one of aspects 1-20.

Aspect 1. A tapped winding stator for use in an electric motor, comprising: a stator body; a plurality of teeth that are adjacent in a circumferential direction; a plurality of slots that are formed between the plurality of teeth; a plurality of coils mounted in each of the plurality of slots, wherein the plurality of coils are tapped in a configuration that allows the stator to selectively bypass one or more of the plurality of coils in operation; and a plurality of switches electrically coupled between the configuration and a respective phase supply to the electric motor, each of the switches having at least a first position and a second position.

Aspect 2. The tapped winding stator of aspect 1 or any aspect herein, wherein each of the plurality of coils comprises a continuous electric conductor having a first end and a second end, the first end forming a stator lead connected to another coil of the stator; and wherein one or more of the plurality of coils are tapped with an additional stator lead.

Aspect 3. The tapped winding stator of aspect 1 or any aspect herein, wherein the bypassing allows the electric motor to operate at an increased amount of torque.

Aspect 4. The tapped winding stator of aspect 1 or any aspect herein, wherein the bypassing occurs when the electric motor operates at a speed above a threshold speed.

Aspect 5. The tapped winding stator of aspect 1 or any aspect herein, wherein the electric motor is an inverter-fed motor.

Aspect 6. The tapped winding stator of aspect 1 or any aspect herein, wherein the electric motor is an induction motor.

Aspect 7. The tapped winding stator of aspect 1 or any aspect herein, wherein the electric motor is a permanent magnet motor.

Aspect 8. A method for increasing a constant horsepower speed range of an electric motor, comprising: coupling an electric motor having a tapped winding stator to a phase supply, the tapped winding stator comprising: a stator body; a plurality of teeth that are adjacent in a circumferential direction; a plurality of slots that are formed between the plurality of teeth; a plurality of coils mounted in each of the plurality of slots, wherein the plurality of coils are tapped in a configuration that allows the stator to selectively bypass one or more of the plurality of coils in operation; and a plurality of switches electrically coupled between the configuration and the phase supply, each of the switches having at least a first position and a second position; and operating the plurality of switches to form electric contacts via the configuration to bypass one or more coils of the plurality of coils from connecting to the phase supply.

Aspect 9. The method of aspect 8 or any aspect herein, wherein each of the plurality of coils comprises a continuous electric conductor having a first end and a second end, the first end forming a stator lead connected to another coil of the stator; and wherein one or more of the plurality of coils are tapped with an additional stator lead.

Aspect 10. method of aspect 8 or any aspect herein, wherein the bypassing allows the electric motor to operate at an increased amount of torque.

Aspect 11. The method of aspect 8 or any aspect herein, wherein the bypassing allows the electric motor to operate at a reduced amount of back EMF.

Aspect 12. The method of aspect 8 or any aspect herein, wherein the electric motor is an inverter-fed motor.

Aspect 13. The method of aspect 8 or any aspect herein, wherein the electric motor is an induction motor.

Aspect 14. The method of aspect 8 or any aspect herein, wherein the electric motor is a permanent magnet motor.

Aspect 15. A method for winding a stator for use in an electric motor, comprising: providing a conductor; winding the conductor along a circumferential direction around a rotation axis corresponding to an axis of symmetry of a stator to form a first stator lead of the conductor; and disposing a second stator lead on the conductor to form an electric contact between the first stator lead and the second stator lead to form a tap.

Aspect 16. The method of aspect 15 or any aspect herein, wherein the plurality of stators leads are configured to bypass one or more coils of the winding and thereby reducing a number of effective conductors per phase.

Aspect 17. The method of aspect 15 or any aspect herein, wherein the plurality of stators leads are configured to bypass one or more coils of the winding and thereby increasing a flux level of the electric motor.

Aspect 18. The method of aspect 15 or any aspect herein, wherein the electric motor is an inverter-fed motor.

Aspect 19. The method of aspect 15 or any aspect herein, wherein the electric motor is an induction motor.

Aspect 20. The method of aspect 15 or any aspect herein, wherein the electric motor is a permanent magnet motor.

The terminology used herein is intended to describe embodiments and is not intended to be limiting. The terms "a," "an," and "the" include the plural forms as well, unless clearly indicated otherwise. The terms "comprises" and/or "comprising," when used in this Specification, specify the presence of the stated features, integers, steps, operations, elements, and/or components, but do not preclude the presence or addition of one or more other features, integers, steps, operations, elements, and/or components.

It is to be understood that changes may be made in detail, especially in matters of the construction materials employed and the shape, size, and arrangement of parts without departing from the scope of the present disclosure. This Specification and the embodiments described are examples, with the true scope and spirit of the disclosure being indicated by the claims that follow.

What is claimed is:

1. A tapped winding stator for use in an electric motor, comprising:
   a stator body;
   a plurality of teeth that are adjacent in a circumferential direction;
   a plurality of slots that are formed between the plurality of teeth, wherein the plurality of slots comprises a first pair of slots and a second pair of slots;
   a plurality of coils mounted in each of the plurality of slots, wherein the plurality of coils are tapped between coils spanning the first pair of slots and spanning the second pair of slots in a configuration that allows the tapped winding stator to selectively bypass one or more of the plurality of coils in operation from a respective phase supply; and
   a plurality of switches electrically coupled between the configuration and the respective phase supply to the electric motor, each of the plurality of switches having at least a first position and a second position.

2. The tapped winding stator of claim 1, wherein each of the plurality of coils comprises a continuous electric conductor having a first end and a second end, the first end forming a stator lead connected to another coil of the tapped winding stator; and wherein one or more of the plurality of coils are tapped with an additional stator lead.

3. The tapped winding stator of claim 1, wherein the bypassing allows the electric motor to operate at an increased amount of torque.

4. The tapped winding stator of claim 1, wherein the bypassing allows the electric motor to operate at a reduced amount of back electromotive force (EMF).

5. The tapped winding stator of claim 1, wherein the electric motor is an inverter-fed motor.

6. The tapped winding stator of claim 1, wherein the electric motor is an induction motor.

7. The tapped winding stator of claim 1, wherein the electric motor is a permanent magnet motor.

8. A method for increasing a constant horsepower speed range of an electric motor, comprising:
coupling an electric motor having a tapped winding stator to a phase supply, the tapped winding stator comprising:
a stator body;
a plurality of teeth that are adjacent in a circumferential direction;
a plurality of slots that are formed between the plurality of teeth, wherein the plurality of slots comprises at least a first pair of slots and a second pair of slots;
a plurality of coils mounted in each of the plurality of slots, wherein the plurality of coils are tapped between coils spanning the first pair of slots and spanning the second pair of slots in a configuration that allows the tapped winding stator to selectively bypass one or more of the plurality of coils in operation from the phase supply; and
a plurality of switches electrically coupled between the configuration and the phase supply, each of the plurality of switches having at least a first position and a second position; and
operating the plurality of switches to form electric contacts via the configuration to bypass one or more coils of the plurality of coils from connecting to the phase supply.

9. The method of claim 8, wherein each of the plurality of coils comprises a continuous electric conductor having a first end and a second end, the first end forming a stator lead connected to another coil of the tapped winding stator; and wherein one or more of the plurality of coils are tapped with an additional stator lead.

10. The method of claim 8, wherein the bypassing allows the electric motor to operate at an increased amount of torque.

11. The method of claim 8, wherein the bypassing allows the electric motor to operate at a reduced amount of back electromotive force (EMF).

12. The method of claim 8, wherein the electric motor is an inverter-fed motor.

13. The method of claim 8, wherein the electric motor is an induction motor.

14. The method of claim 8, wherein the electric motor is a permanent magnet motor.

15. A method for winding a stator for use in an electric motor, comprising:
obtaining a conductor;
winding the conductor along a circumferential direction around a rotation axis corresponding to an axis of symmetry of the stator to form a first stator lead of the conductor; and
disposing a second stator lead on the conductor to form an electric contact between the first stator lead and the second stator lead to form a tap,
wherein the tapping is between coils spanning a first pair of slots of a plurality of slots of the stator and spanning a second pair of slots of the plurality of slots of the stator and to a phase supply.

16. The method of claim 15, wherein the second stator lead is configured to bypass one or more conductors of the winding and reduce a number of effective conductors per phase.

17. The method of claim 15, wherein the second stator lead is configured to bypass one or more conductors of the winding and increase a flux level of the electric motor.

18. The method of claim 15, wherein the electric motor is an inverter-fed motor.

19. The method of claim 15, wherein the electric motor is an induction motor.

20. The method of claim 15, wherein the electric motor is a permanent magnet motor.

* * * * *